United States Patent [19]

Yumura et al.

[11] Patent Number: 5,742,926
[45] Date of Patent: Apr. 21, 1998

[54] METHOD OF UPDATING INFORMATION RELATING TO PRIORITIES ASSIGNED TO CONVERSION CANDIDATES

[75] Inventors: Takeshi Yumura, Neyagawa; Takaaki Ueyama, Gobo, both of Japan

[73] Assignee: Sanyo Electric Co., Ltd., Moriguchi, Japan

[21] Appl. No.: 600,374

[22] Filed: Feb. 13, 1996

[30] Foreign Application Priority Data

Oct. 20, 1995 [JP] Japan ................................ 7-272912

[51] Int. Cl.⁶ .................................................. G06F 17/28
[52] U.S. Cl. ........................................... 704/2; 704/10
[58] Field of Search ................................. 395/752, 760, 395/757, 794; 704/2, 7, 10; 707/532

[56] References Cited

U.S. PATENT DOCUMENTS

| | | | |
|---|---|---|---|
| 4,706,212 | 11/1987 | Toma | 395/752 |
| 5,416,896 | 5/1995 | Motoyama | 395/794 |
| 5,418,957 | 5/1995 | Narayan | 395/973 |
| 5,483,629 | 1/1996 | Motoyama et al. | 395/946 |
| 5,497,319 | 3/1996 | Chong et al. | 395/760 |
| 5,625,553 | 4/1997 | Kutsumi et al. | 395/752 |

*Primary Examiner*—Donald E. McElheny, Jr.
*Attorney, Agent, or Firm*—Beveridge, Degrandi, Weilacher & Young, LLP.

[57] ABSTRACT

When an updated version of a document conversion application is installed, comparison is made for each word to be converted between a conversion candidate assigned the first priority corresponding to the word to be converted which is held in an old basic dictionary and a conversion candidate assigned the first priority corresponding to the word to be converted which is held in a new basic dictionary. When the conversion candidates assigned the first priority corresponding to the word to be converted differ from each other, priorities assigned to conversion candidates corresponding to the word to be converted in the new basic dictionary are so changed that the conversion candidate assigned the first priority corresponding to the word to be converted which is held in the old basic dictionary also becomes the conversion candidate assigned the first priority corresponding to the word to be converted in the new basic dictionary.

8 Claims, 2 Drawing Sheets

METHOD OF UPDATING INFORMATION RELATING TO PRIORITIES ASSIGNED TO CONVERSION CANDIDATES

BACKGROUND OF THE INVENTION

1. Field of the Invention

The present invention relates to a method of updating information relating to priorities assigned to conversion candidates, in which information relating to priorities assigned to equivalent candidates or information relating to priorities assigned to homonymous idiom candidates which are held in an old basic dictionary can be reflected in a new basic dictionary when the version of a document conversion application such as translation software, kana-kanji conversion software, or word processor software is updated.

2. Description of the Prior Art

When mechanical translation is made in a translating machine on which English-Japanese translation software for translating English into Japanese is carried, an equivalent candidate assigned the first priority out of equivalent candidates corresponding to a certain word is assigned as an equivalent corresponding to the word. A user selects a suitable equivalent out of a plurality of equivalent candidates presented by the translating machine with respect to an unsuitable equivalent in an obtained translated sentence, whereby the equivalent is corrected. When the equivalent is thus corrected, the translating machine changes priorities assigned to the equivalent candidates corresponding to the word so that the priority assigned to the selected equivalent candidate becomes the first priority.

Consequently, translation has been made by the translating machine, whereby priorities assigned to equivalent candidates corresponding to each word have been changed depending on the type of the original text treated by the user, for example. Specifically, as the number of times of translation by the translating machine becomes larger, equivalent candidates suitable for a document treated by the user are first selected.

The same is true for a kana-kanji conversion function of a word processor (including a general purpose device such as a personal computer in addition to a dedicated device) on which Japanese word processor software comprising a kana-kanji conversion function is carried. Specifically, when certain "kana" is entered, an idiom candidate assigned the first priority is automatically selected out of homonymous idiom candidates corresponding to the "kana". When it is considered that kanji selected by the word processor is not suitable, the user selects a suitable idiom candidate out of the idiom candidates corresponding to the "kana" presented by the word processor, to correct an idiom. When the idiom is thus corrected, priorities assigned to the idiom candidates corresponding to the "kana" are so changed that the priority assigned to the selected idiom candidate becomes the first priority.

When an updated version of the translation software is installed in the translating machine in which the translation software has been already installed, or when an updated version of the word processor software is installed in the word processor in which the word processor software has been already installed, it can be chosen whether the old basic dictionary is canceled and is changed to a new basic dictionary or the old basic dictionary is used as it is as a basic dictionary without using a new basic dictionary.

When the old basic dictionary is canceled and is changed to a new basic dictionary, information relating to priorities assigned to conversion candidates such as equivalent candidates or idiom candidates so far stored is lost. On the other hand, when the old basic dictionary is used as it is as a basic dictionary without using a new basic dictionary, information relating to priorities assigned to conversion candidates such as equivalent candidates or idiom candidates so far stored is held. Since many improvements of the new basic dictionary over the old basic dictionary are generally achieved, the improvements cannot be effectively utilized.

SUMMARY OF THE INVENTION

An object of the present invention is to provide a method of updating information relating to priorities assigned to conversion candidates, in which information relating to priorities assigned to conversion candidates so far stored can be reflected in a new basic dictionary even after installing an updated version when the version of a document conversion application such as translation software or word processor software is updated, and improvements of the new basic dictionary can be effectively utilized even after installing the updated version.

A first method of updating information relating to priorities assigned to conversion candidates is characterized by comprising the steps of comparing for each word to be converted a conversion candidate assigned the first priority corresponding to the word to be converted which is held in an old basic dictionary with a conversion candidate assigned the first priority corresponding to the word to be converted which is held in a new basic dictionary when an updated version of a document conversion application is installed, and changing, when the conversion candidates assigned the first priority corresponding to the word to be converted differ from each other, priorities assigned to conversion candidates corresponding to the word to be converted in the new basic dictionary so that the conversion candidate assigned the first priority corresponding to the word to be converted which is held in the old basic dictionary also becomes the conversion candidate assigned the first priority corresponding to the word to be converted in the new basic dictionary.

A second method of updating information relating to priorities assigned to conversion candidates is characterized by comprising the steps of comparing for each word to be converted a conversion candidate assigned the first priority corresponding to the word to be converted which is held in an old basic dictionary with a conversion candidate assigned the first priority corresponding to the word to be converted which is held in a new basic dictionary when an updated version of a document conversion application is installed, judging, when the conversion candidates assigned the first priority corresponding to the word to be converted differ from each other, whether or not the conversion candidate assigned the first priority corresponding to the word to be converted which is held in the old basic dictionary exists as a conversion candidate corresponding to the word to be converted in the new basic dictionary, and changing, when it is judged that the conversion candidate assigned the first priority corresponding to the word to be converted which is held in the old basic dictionary exists, priorities assigned to conversion candidates corresponding to the word to be converted in the new basic dictionary so that the conversion candidate assigned the first priority corresponding to the word to be converted which is held in the old basic dictionary also becomes the conversion candidate assigned the first priority corresponding to the word to be converted in the new basic dictionary.

When the document conversion application is a translation application for translating English into Japanese, the word to be converted is an English word, for example, and the conversion candidate is Japanese corresponding to the English word.

When the document conversion application is a translation application for translating Japanese into English, the word to be converted is a Japanese phrase, for example, and the conversion candidate is English corresponding to the Japanese phrase.

When the document conversion application is an application comprising a kana-kanji conversion function, the word to be converted is "kana", and the conversion candidate is an idiom corresponding to the "kana".

In the first or second method of updating information relating to priorities assigned to conversion candidates according to the present invention, when the updated version of the document conversion application is installed, the priorities assigned to the conversion candidates corresponding to each of the words to be converted in the new basic dictionary are so changed that the conversion candidate assigned the first priority corresponding to the word to be converted which is held in the old basic dictionary also becomes the conversion candidate assigned the first priority corresponding to the word to be converted in the new basic dictionary. Consequently, the information relating to the priorities assigned to the conversion candidates so far stored can be reflected in the new basic dictionary even after installing the updated version, and improvements of the new basic dictionary can be also effectively utilized after installing the updated version.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
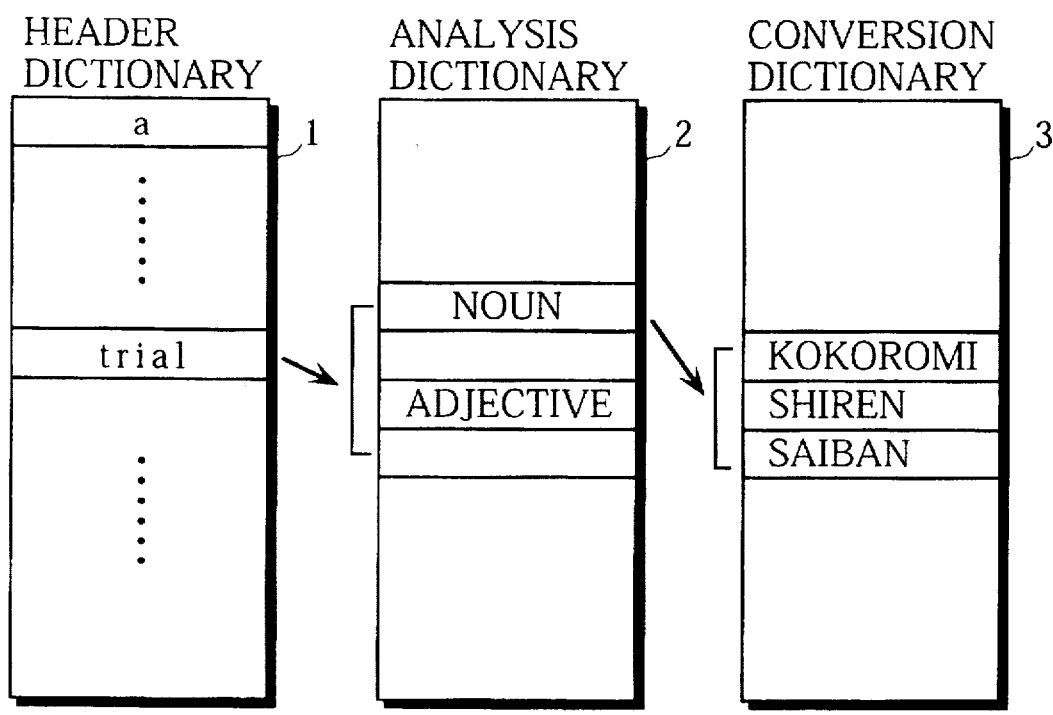
FIG. 1 is a schematic diagram showing a basic dictionary provided in a translating machine.

Referring now to the drawings, description is made of an embodiment in a case where the present invention is applied to a translating machine on which English-Japanese translation software for technically translating English into Japanese is carried.

FIG. 1 illustrates a basic dictionary provided in a translating machine.

The basic dictionary comprises a header dictionary 1, an analysis dictionary 2 and a conversion dictionary 3. In the header dictionary 1, respective English words, for example, are stored as keywords. In the analysis dictionary 2, analysis information of parts of speech, for example, is stored for each of the keywords in the header dictionary 1. In the conversion dictionary 3, Japanese equivalent candidates are stored for each part Of speech of each of the keywords in the header dictionary 1. The three dictionaries are related to each other. For example, a keyword "trial" has a noun and an adjective. Japanese equivalent candidates "Kokoromi", "Shiren" and "Saiban" are stored in a predetermined area of the conversion dictionary 3 with respect to the noun of the keyword "trial" In the area of the conversion dictionary 3 where the Japanese equivalent candidates corresponding to the noun of the keyword "trail" are stored, a Japanese equivalent candidate assigned the highest priority (hereinafter referred to as a first-priority equivalent candidate) with respect to the noun of the keyword "trial" is stored in the head storage position. In an example of FIG. 1, the first-priority equivalent candidate corresponding to the noun of the keyword "trial" is "Kokoromi".

When "trial" is used as a noun in the original text which is to be translated, therefore, "Kokoromi" is selected as the Japanese equivalent for "trial". When a user judges that "Kokoromi" is not suitable as the Japanese equivalent for "trial", the user causes the translating machine to present the Japanese equivalent candidates corresponding to the noun of the keyword "trial", to select a suitable Japanese equivalent candidate and change the unsuitable Japanese equivalent. For example, it is assumed that the user selects "Saiban" as a suitable Japanese equivalent. In this case, the Japanese equivalent for "trial" is changed from "Kokoromi" to "Saiban".

When the Japanese equivalent is thus changed, "Saiban" which is the selected Japanese equivalent candidate is stored as a first-priority equivalent candidate in the head storage position in the area of the conversion dictionary 3 where the Japanese equivalent candidates corresponding to the noun of the keyword "trial" are stored. "Kokoromi" which has been so far the first-priority equivalent candidate is shifted to the second storage position from the head, and "Shiren" which is the Japanese equivalent candidate stored in the second storage position from the head is shifted to the third storage position from the head.

Figure 2:
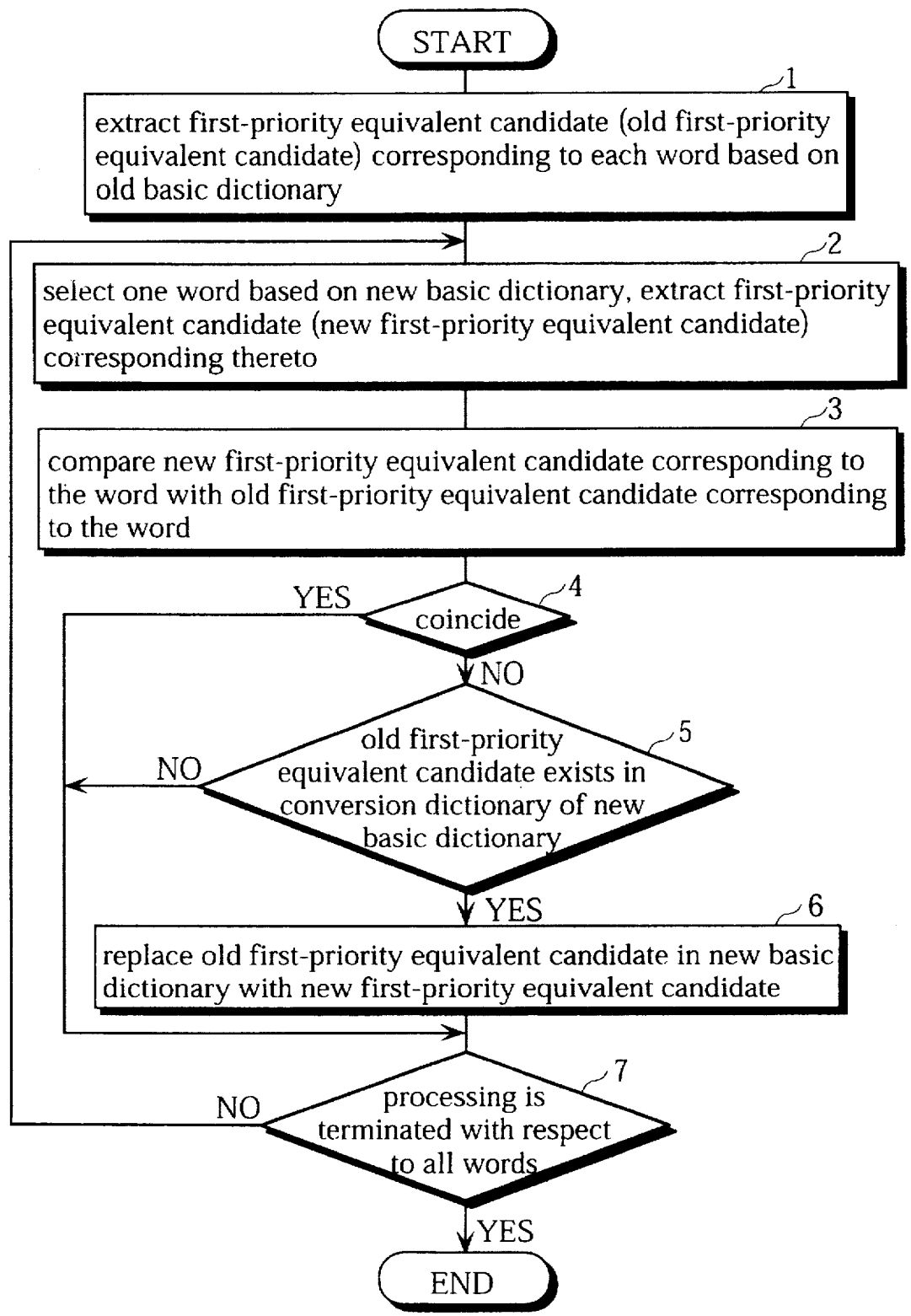
FIG. 2 is a flow chart showing the procedure for updating processing of information relating to priorities assigned to equivalent candidates which is executed when an updated version of translation software is installed in a translating machine.

FIG. 2 shows the procedure for updating processing of information relating to priorities assigned to equivalent candidates which is executed when an updated version of translation software is installed in a translating machine. In the following description, a "word" shall mean a keyword for each part of speech. Specifically, a keyword "trial" includes a noun "trial" and an adjective "trial". In the following description, they are separate words.

A first-priority equivalent candidate (hereinafter referred to as an old first-priority equivalent candidate) is first extracted for each word on the basis of an old basic dictionary (step 1).

One word is then selected on the basis of a new basic dictionary, and a first-priority equivalent candidate (hereinafter referred to as a new first-priority equivalent candidate) corresponding thereto is extracted (step 2).

The new first-priority equivalent candidate corresponding to the word selected in the step 2 and the old first-priority equivalent candidate corresponding to the word are then compared with each other (step 3).

When it is judged that both do not coincide with each other (NO in the step 4), it is judged whether or not the old first-priority equivalent candidate corresponding to the word exists as an equivalent candidate corresponding to the word in a conversion dictionary of the new basic dictionary (step 5).

When it is judged that the old first-priority equivalent candidate corresponding to the word exists, equivalent candidates corresponding to the word in the conversion dictionary of the new basic dictionary are replaced with each other (step 6). Specifically, the old first-priority equivalent candidate corresponding to the word is stored in the head storage position of an area where the equivalent candidates corresponding to the word are stored, and the other equivalent candidate which has been so far stored in the head storage position is stored in the storage position where the old first-priority equivalent candidate has been stored. Consequently, the old first-priority equivalent candidate corresponding to the word is also an equivalent candidate assigned the first priority in the conversion dictionary of the new basic dictionary.

It is judged whether or not the processing in the steps 2 to 6 is performed with respect to all the words (step 7), the program is returned to the step 2 if the processing is not performed. Consequently, processing with respect to the succeeding word is started.

When it is judged in the step 4 that the new first-priority equivalent candidate corresponding to the word selected in the step 2 and the old first-priority equivalent candidate corresponding to the word coincide with each other, or it is judged in the step 5 that the old first-priority equivalent candidate does not exist in the conversion dictionary of the new basic dictionary, the program is returned to the step 2 without replacing the equivalent candidates with each other (changing the priorities assigned to the equivalent candidates) in the step 6.

When the processing in the steps 2 to 6 is performed with respect to all the words in above-mentioned manner (YES in the step 7), the updating processing of the information relating to the priorities assigned to the equivalent candidates is terminated.

Although in the above-mentioned embodiment, description was made of English to Japanese translation software for mechanically translating English to Japanese, the present invention is applicable to a document conversion application such as Japanese to English translation software for mechanically translating Japanese into English or word processor software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of updating information relating to priorities assigned to conversion candidates, comprising the steps of:
    comparing for each word to be converted a conversion candidate assigned the first priority corresponding to the word to be converted which is held in an old basic dictionary with a conversion candidate assigned the first priority corresponding to the word to be converted which is held in a new basic dictionary when an updated version of a document conversion application is installed; and
    changing, when the conversion candidates assigned the first priority corresponding to the word to be converted differ from each other, priorities assigned to conversion candidates corresponding to the word to be converted in the new basic dictionary so that the conversion candidate assigned the first priority corresponding to the word to be converted which is held in the old basic dictionary also becomes the conversion candidate assigned the first priority corresponding to the word to be converted in the new basic dictionary.

2. The method according to claim 1, wherein
    the document conversion application is a translation application for translating English into Japanese,
    the word to be converted is an English word, and
    the conversion candidate is Japanese corresponding to the English word.

3. The method according to claim 1, wherein
    the document conversion application is a translation application for translating Japanese into English,
    the word to be converted is a Japanese phrase, and
    the conversion candidate is English corresponding to the Japanese phrase.

4. The method according to claim 1, wherein
    the document conversion application is an application comprising a kana-kanji conversion function,
    the word to be converted is "kana", and
    the conversion candidate is an idiom corresponding to the "kana".

5. A method of updating information relating to priorities assigned to conversion candidates, comprising the steps of:
    comparing for each word to be converted a conversion candidate assigned the first priority corresponding to the word to be converted which is held in an old basic dictionary with a conversion candidate assigned the first priority corresponding to the word to be converted which is held in a new basic dictionary when an updated version of a document conversion application is installed;
    judging, when the conversion candidates assigned the first priority corresponding to the word to be converted differ from each other, whether or not the conversion candidate assigned the first priority corresponding to the word to be converted which is held in the old basic dictionary exists as a conversion candidate corresponding to the word to be converted in the new basic dictionary; and
    changing, when it is judged that the conversion candidate assigned the first priority corresponding to the word to be converted which is held in the old basic dictionary exists, priorities assigned to conversion candidates corresponding to the word to be converted in the new basic dictionary so that the conversion candidate assigned the first priority corresponding to the word to be converted which is held in the old basic dictionary also becomes the conversion candidate assigned the first priority corresponding to the word to be converted in the new basic dictionary.

6. The method according to claim 5, wherein
    the document conversion application is a translation application for translating English into Japanese,
    the word to be converted is an English word, and
    the conversion candidate is Japanese corresponding to the English word.

7. The method according to claim 5, wherein
    the document conversion application is a translation application for translating Japanese into English,
    the word to be converted is a Japanese phrase, and
    the conversion candidate is English corresponding to the Japanese phrase.

8. The method according to claim 5, wherein
    the document conversion application is a translation application comprising a kana-kanji conversion function,
    the word to be converted is "kana", and
    the conversion candidate is an idiom corresponding to the "kana".

* * * * *

UNITED STATES PATENT AND TRADEMARK OFFICE
CERTIFICATE OF CORRECTION

PATENT NO. : 5,742,926
DATED : April 21, 1998
INVENTOR(S) : Yumura, et. al.

It is certified that error appears in the above-identified patent and that said Letters Patent is hereby corrected as shown below:

Title page, item [73], Assignee: change "Sanvo Electric Co., Ltd." to -- Sanyo Electric Co., Ltd.--.

Signed and Sealed this

Fifteenth Day of December, 1998

Attest:

BRUCE LEHMAN

Attesting Officer

Commissioner of Patents and Trademarks